United States Patent [19]

Gazzano

[11] 3,909,717

[45] Sept. 30, 1975

[54] CIRCUIT FOR ENHANCING RESOLUTION IN TACHOMETER SIGNALS

[75] Inventor: Donald J. Gazzano, San Carlos, Calif.

[73] Assignee: Ampex Corporation, Redwood City, Calif.

[22] Filed: Apr. 22, 1974

[21] Appl. No.: 462,898

Related U.S. Application Data

[63] Continuation of Ser. No. 371,044, June 18, 1973, abandoned.

[52] U.S. Cl. .................. 324/166; 324/82; 307/261; 328/20; 328/28; 328/38

[51] Int. Cl.².... G01P 3/48; H03K 5/00; H04B 1/40

[58] Field of Search ........... 324/161, 166, 173, 174, 324/175, 78 D, 78 F, 78 J, 82; 328/20, 28, 328/29, 31, 32, 38, 140, 150; 150; 307/261, 307/271, 290, 220 R, 225 R, 235 R

[56] References Cited

UNITED STATES PATENTS

| | | | |
|---|---|---|---|
| 3,465,348 | 9/1969 | Brewster | 307/225 R |
| 3,593,156 | 7/1971 | Jordan | 328/20 |
| 3,601,705 | 8/1971 | Germann | 328/20 |
| 3,648,062 | 3/1972 | Bozoian | 307/220 |
| 3,768,024 | 10/1973 | Letosky | 307/235 R |
| 3,808,543 | 4/1974 | Mueller | 328/20 |

*Primary Examiner*—Alfred E. Smith
*Assistant Examiner*—Rolf Hille

[57] ABSTRACT

Tachometer signal resolution is enhanced by generating in phase and opposite sign representations of the signal and employing the representations in the detection of the zero axis crossovers in the signal to achieve frequency doubling. An additional enhancement capability is obtainable by preliminarily processing the tachometer signal through one or more frequency compressors.

10 Claims, 3 Drawing Figures

CIRCUIT FOR ENHANCING RESOLUTION IN TACHOMETER SIGNALS

The invention herein described was made in the course of a contract with the Department of the Navy.

This is a continuation of copending application Ser. No. 371,044 filed June 18, 1973, now abandoned.

This invention relates to a tachometer signal circuit for enhancing resolution and, more particularly, relates to a circuit for multiplying the frequency of a tachometer signal by detecting zero axis crossovers in the signal.

In precision servo systems it has been the practice to utilize complex optical systems or sensitive electromechanical devices to provide a precise determination of the location of the servomotor shaft at any point in time. The greater the precision required in determining the location of the servomotor shaft, the more sophisticated the system and the higher the cost. For example, it has been common with optical systems to utilize tachometer discs attached to the servomotor shaft which have as many as ten thousand discrete radial lines imprinted thereon. Such discs are costly to fabricate and add appreciably to the overall unit price. For certain applications, e.g. for continuous record/reproduce systems where the volume of tape is to be limited or in any case where it is desired to limit tape volume, it is necessary to operate the servomotors at low speed. For such applications it may be impracticable to machine lines finely enough, e. g. more finely than 10,000 lines per disc, to achieve adequate resolution of the tachometer signal. Thus, the achievement of adequate resolution is a problem either in cost or inherently in fabrication.

In the prior art the multiplication of the frequency of a tachometer signal for the purpose of increasing servo bandwidth to enhance resolution has involved complex modulation schemes as well as multiple light sources and photo receptors. Such methods have been difficult to implement. They might require, for example, that a light fiber bundle pick up light from a light emitting diode which is interrupted by a rotating tach disc so that an image of moving strobe lines from one part of a disc is superimposed onto moving strobe lines from another part of the disc so that both sets of lines are simultaneously sensed by a photoreceptor. If the fiber bundle is rotated slightly a moving moire pattern of the intersections of the strobe lines is generated with the speed of travel of the pattern being directly proportional to the tachometer disc speed. The precise registration required for such a system is difficult to achieve mechanically.

SUMMARY OF THE INVENTION

Accordingly, it is an object of the present invention to provide a tachometer signal circuit which enhances resolution, i. e. increases servo bandwidth, by multiplying the frequency of the tachometer signal. Increasing the frequency of a tachometer signal, a signal whose magnitude is variable about an axis and usually essentially sinusoidal due to the rotational character of the movement in question, by a factor of two is accomplished by employing an axis crossover circuit to produce a signal which is representative of the two signal magnitude axis crossovers present in each wavelength of the tachometer signal. The frequency of the tachometer signal may be preliminarily multiplied by frequency compressors which introduce harmonics onto the fundamental frequency but whose harmonics of a higher order than two have insignificant signal strength so that an effective frequency doubling is obtained by each compressor.

BRIEF DESCRIPTION OF THE DRAWINGS

For a more complete understanding of the tachometer signal circuit of the present invention reference may be had to the accompanying drawings which are incorporated by reference herein and in which.

DESCRIPTION OF THE PREFERRED EMBODIMENT

Figure 1:
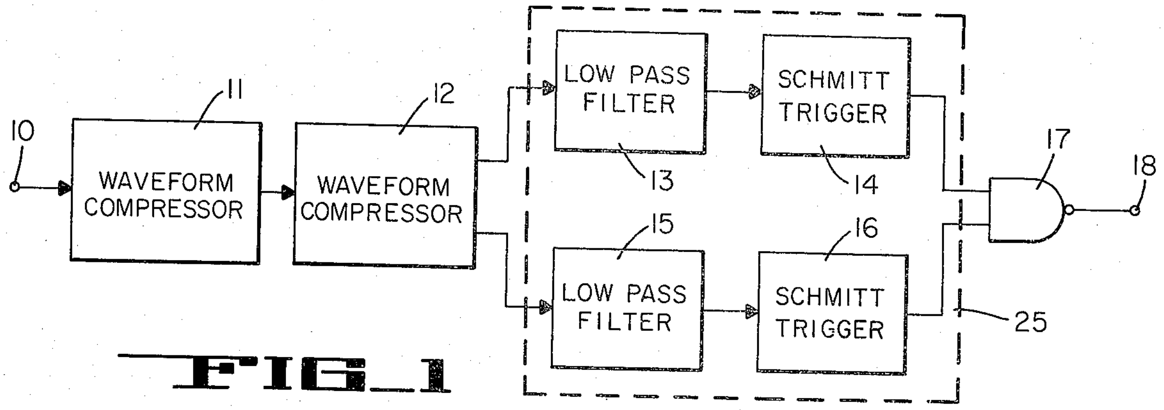
FIG. 1 is a block diagram illustrating the circuit elements of the preferred embodiment of the tachometer signal circuit.
Figure 3:
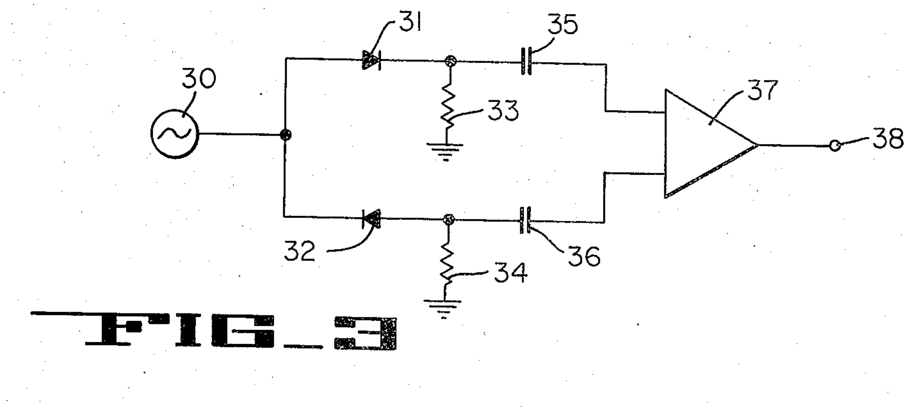
FIG. 3 is a frequency compressor of the type preliminarily utilized in FIG. 1.

A preferred embodiment of the tachometer signal circuit is shown in FIG. 1. A standard tachometer voltage signal from a photoreceptor which optically senses the presence and absence of strobe lines imprinted on a rotating tachometer disc is introduced at terminal 10. The frequency of this signal may have been previously multiplied by an optical means such as the continuous superposition of strobe lines sensed from two positions on a tachometer disc. The signal is then introduced to a waveform compressor 11 which doubles its frequency. A suitable circuit for waveform compressor 11 is shown in FIG. 3; such circuits are known in the art. The signal is then introduced to a second waveform compressor 12 which again doubles its frequency. Waveform compressor 12 is configured with a differential output which produces in phase two modes or representations of the frequency doubled tachometer signal, the modes having the same time base but an inverted sign; in the circuit of FIG. 3 differential amplifier 37 would be configured with the two mode output. One mode of the tachometer signal is introduced to each of the branches of dual branch subcircuit 25: one mode is introduced to low pass filter 13 while the other is introduced to low pass filter 15. The respective filters serve to screen out extraneous signals.

The output of low pass filter 13 is introduced to schmitt trigger 14 and the output of the low pass filter 15 is introduced to schmitt trigger 16. The schmitt trigger is a standard trigger circuit; see Reference Data for Radio Engineers, 5th Ed., 17-13. It essentially transforms a variable signal into a flat-topped pulse whenever the value of the signal exceeds a preset limit. Schmitt triggers 14 and 16 are configured, respectively, with a lower preset limit, the "lower trigger point" and an upper preset limit, the "upper trigger point" so that within these limits their outputs are a flat-topped pulse of known amplitude, which in the illustrated embodiment is represented as a negative signal level; outside these limits their outputs are zero or a positive signal level. These trigger points are set, as discussed below with respect to tachometer signal transformation, to bracket the zero crossovers. Zero crossovers are the points at which the tachometer signal amplitude changes sign. Zero crossovers are selected as the measurement point on the curve as it is possible to precisely pinpoint their location in time. The frequency of these crossovers is directly related to the angular velocity of the tachometer disc and thus the speed of the servometer or other rotating shaft. The time interval between any two points on the curve could be determined by appropriate settings of the schmitt trigger; such an interval would be related to tachometer position but could also be affected by amplitude instability which may be a function of the mechanical alignment of the tach disc on the servometer shaft.

The pulse outputs of schmitt triggers 14 and 16 are next introduced into differential inputs of NAND gate 17. A NAND gate is a logic element which has a positive output, i.e., a logical "one," if either input or both inputs are low or negative and a zero output if both inputs are high or positive. Thus, the output of NAND gate 17 which is read at terminal 18 is "one" with a length having zero amplitude and representing the overlap of the positive portions of the outputs of the schmitt triggers which as described below, represents the time between a zero crossover and the activation of the next upper trigger point of either mode of the output of waveform compressor 12. Since there are two zero crossings per wavelength, the pulse output of NAND gate 17 represents an effective doubling of waveform compressor 12.

Figure 2:
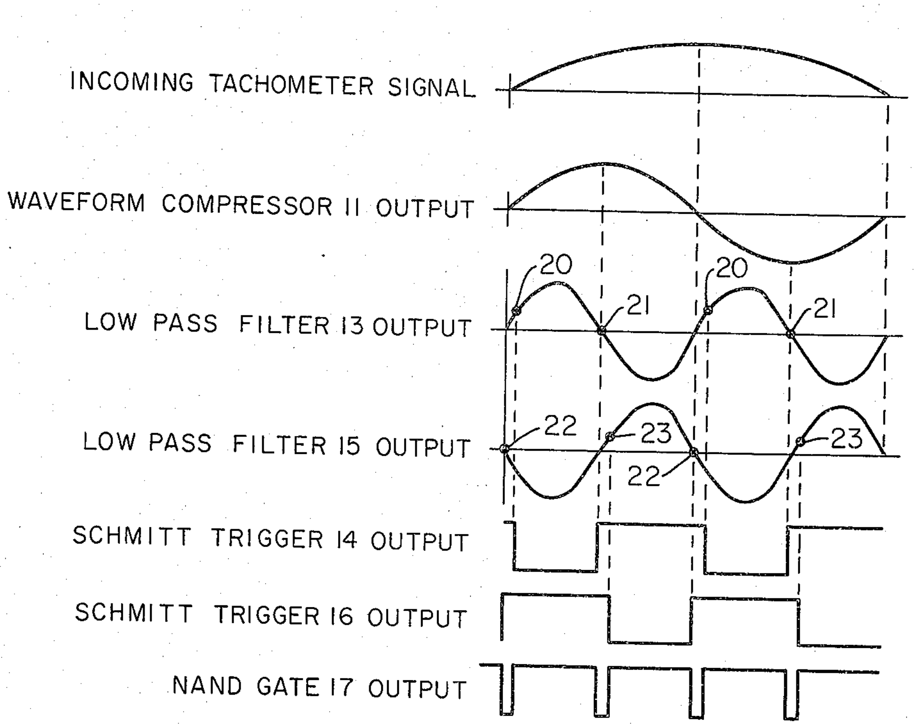
FIG. 2 is a sequential representation of the tachometer signal as it is processed by the circuit of FIG. 1.

The operation of the tachometer signal circuit of the present invention on a tachometer signal to produce its transformation to a frequency multiplied signal may be better understood by reference to the schematic illustrations of FIG. 2. One half cycle of the incoming sinusoidally varying tachometer signal is shown in the topmost diagram. The waveform compressor 11, as described below, serves to double the frequency of the incoming signal. The second waveform compressor 12 again doubles the frequency of the tachometer signal. The output of waveform compressor 12 is configured with a differential output which produces in phase two modes or representations of the frequency doubled tachometer signal, the modes having the same time base but an inverted sign. The two modes of the output are introduced to low pass filter 13 and low pass filter 15, respectively, and are illustrated in the next two diagrams of FIG. 2. Upper trigger point 20 and lower trigger point 21 of schmitt trigger 14 as well as upper trigger point 23 and lower trigger point 22 of schmitt trigger 16 are also shown on these diagrams.

Since the two modes of the tachometer signal have the same time base but are inverted in sign, placement of the lower trigger points 21 and 22 of schmitt triggers 14 and 16, respectively, at the negative going zero crossover effectively tags both zero crossovers of tachometer signal. Upper trigger points 20 and 23 of schmitt triggers 14 and 16, respectively, are placed slightly above the positive going zero crossovers. The pulse outputs of the respective schmitt triggers, then, are positive for the negative portions of the tachometer signal as well as for a slight part of the positive portion. Since the two modes of the signal are inverted, the schmitt trigger outputs will represent different portions of the cycle of the tachometer signal as provided to the input of the filters 13 and 15 and overlap in time for short periods corresponding to these slight parts of the positive portion of the signal. NAND gate 17 operates on these schmitt trigger outputs to produce a signal which represents the overlap of the schmitt trigger outputs as shown by the dotted vertical lines and as shown in the last diagram. Each negative going transition of the NAND gate output coincides with each zero crossover while each positive going transition coincides with an upper trigger point. Information, then, is contained only at the negative going transitions and, in fact, for the circuit shown in FIG. 1 represents an eight fold mutliplication of the frequency of the incoming tachometer signal.

The preliminary multiplication accomplished in waveform compressors 11 and 12 in the tachometer signal circuit of the preferred embodiment of FIG. 1 may be of the type shown in FIG. 3; see also Electronic Design News, Aug. 1, 1971, pp. 39–40. Variable signal, e. g. a sinusoidal signal, is generated by source 30 and introduced to the circuit as shown. The circuit then divides into two branches, each branch first having diodes 31 and 32, respectively, (inserted in inverted order with respect to each other), resistors 33 and 34, respectively, interconnecting the branch and ground, and capacitors 35 and 36, respectively. The outputs of the two branches are introduced to differential amplifier 37 whose output is read at terminal 38. If, as set out above, it is desired to take the output of differential amplifier in two modes, one inverted with respect to the other, differential amplifier 37 is configured with a two mode output by separating the signal on the two collector stages.

If the input signal to the waveform compressor of FIG. 3 is idealized in the form $\alpha \sin wt$ and all harmonics higher than second harmonics are dropped due to their insignificant signal strength the solution of the network equations gives an output signal at terminal 38:

$$\text{output} \approx (I_1 \alpha_1 - I_2\alpha_2) \sin wt - \tfrac{1}{4} (I_1\alpha_1 2 + I_2\alpha_2 2) \cos 2\, wt$$

where $I_1$ and $I_2$ are the respective collector currents for the upper and lower branches of the differential amplifier 37; and $\alpha_1$ and $\alpha_2$ are constants for diodes 31 and 32, respectively.

The first term represents the fundamental of the input signal while the second term represents the second harmonic. If the circuit is balanced $I = I_1 = I_2$ and $\alpha_1 = \alpha_2$ so that the output signal is given by $$\text{output} \approx -\tfrac{1}{2}\, I\, \alpha \cos 2\, wt$$

Thus, the output signal has twice the frequency of the input signal. The relative amplitude of the signal is unimportant since, as described above, the frequency alone is used to determine tachometer position.

In addition to the preferred embodiment set out above the zero crossover circuit 25 may be employed by itself without preliminary waveform compression stages to accomplish a frequency doubling; when so employed the inputs to the two branches should be separated in phase by 180° and the outputs of the two branches should be introduced to means for determining the overlap of the schmitt trigger outputs, e. g. a NAND gate as previously described or on a appropriately connected AND gate. The use of a single preliminary waveform compressor or more than two preliminary frequency multiplication steps is possible providing the tachometer signal is a time varying essentially sinusoidal signal when it is introduced, after inversion, to zero crossover circuit 25. The waveform compressor of FIG. 3 has been found to be a particularly useful and reliable preliminary multiplication unit.

While several embodiments of the tachometer signal circuit of the present invention have been set out above the invention is intended to be limited solely by the scope and spirit of the appended claims.

What I claim is:

1. A circuit for enhancing the resolution of a tachometer signal whose magnitude sinusoidally varies about an axis by determining the axis crossovers, comprising:

a means for generating two in phase representations of said sinusoidally varying signal with one of said representations inverted in sign with respect to the other;

a dual branch circuit, one of said representations being introduced to each of said branches, each branch of said circuit comprising a means for generating a pulse representative of a selected portion of the cycle of said representation introduced therein, said selected portion represented by the pulse generated by said means of one branch occurring at a time different from the occurrence of the selected portion represented by the pulse generated by the means of the other branch; and means for receiving said pulses from said dual branches and responsive to each pulse representative of a selected portion of the cycle to initiate the generation of a signal and to the following pulse representative of another selected portion of the cycle to terminate the generation of said signal and thereby produce a signal representative of the axis crossovers of said sinusoidally varying signal.

2. A circuit in accordance with claim 1 wherein said means for generating representations of said sinusoidally varying signal is a differential amplifier with a two mode inverted output, said means for generating a pulse representative of a portion of said representation of said sinusoidally varying signal is a schmitt trigger, and said receiving means is a NAND gate.

3. A circuit in accordaance with claim 2 wherein low pass filters are inserted between the respective outputs of said differential amplifier and each of said schmitt triggers.

4. A circuit in accordance with claim 3 wherein lower trigger points on said schmitt triggers are placed at negativegoing axis crossovers and upper trigger points on said schmitt triggers are placed slightly above positive going axis crossovers.

5. A circuit in accordance with claim 4 in combination with at least one frequency compressor for accomplishing a preliminary frequency multiplication prior to said operation to produce the signal representation of said axis crossovers.

6. A circuit in accordance with claim 5 wherein two frequency compressors are employed.

7. A circuit in accordance with claim 6 wherein said frequency compressors comprise a dual branch circuit, each of said branches consisting, in order, of a diode, said diodes being inserted in their respective branches in inverted order with respect to each other, a resistor interconnected between each branch and ground and a capacitor, the output of said branches being introduced to a differential amplifier with a two mode inverted output so that the outputs of said amplifier represent a doubling of the frequency of the signal introduced to said dual branch circuit, the frequency compressor which is connected to said low pass filters producing said representations by taking the respective outputs from said differential amplifier of the other frequency compressor.

8. A circuit for enhancing the resolution of a tachometer signal that periodically varies about an axis by determining axis crossovers, comprising:

means for generating two in phase representations of said tachometer signal with one of said representations inverted in sign with respect to the other;

a first pulse generator means connected to receive one of said in phase representations and responsive each time said one representation crosses through its axis in a selected direction to generate a first pulse of a duration less than the interval between said axis crossover and the following axis crossover of said representation;

a second pulse generator means connected to receive the other of said in phase representations and responsive each time said other representation crosses through its axis in said selected direction to generate a second pulse of a duration less than the inverval between said axis crossover and the following axis crossover of said other representation; and means responsive to the time relationship of each pulse generated by a pulse generator means and following pulse generated by the other pulse generating means to generate a signal representative of the axis crossover of said periodically varying tachometer signal.

9. A circuit in accordance with claim 8 wherein said first pulse generator means is responsive to each of the one representations to initiate the generation of the first pulse at a predetermined time after said one representation crosses its axis in the selected direction and to terminate the generation of said first pulse in response to said one representation next crossing its axis in a direction opposite said selected direction; said second pulse generator means is responsive to the other representation to initiate the generator of the second pulse at a predetermined time after said other representation crosses its axis in said selected direction and to terminate the generation of said second pulse in response to said other representation next crossing its axis in a direction opposite said selected direction; and the time relationship responsive means is responsive to each initiating edge of each of said first and second pulses and the following terminating edge of the other of said first and second pulses to generate a pulse as the axis crossover representative signal.

10. A circuit in accordance with claim 1 wherein each of said two in phase representations in a sinusoidal signal varying about an axis, each of said pulse generating means is responsive to the sinusoidal signal representation introduced therein to initiate the generation of a pulse at a predetermined time after said representation crosses said axis in a selected direction and to terminate the generation of said pulse in response to said representation next crossing said axis in a direction opposite said selected direction, and said means for receiving said pulses from said dual branches is responsive to a selected one of the edges of each pulse from a branch and the other edge of the following pulse from another branch to generate a pulse signal representative of the axis crossovers of said sinusoidally varying signal.

* * * * *